UNITED STATES PATENT OFFICE.

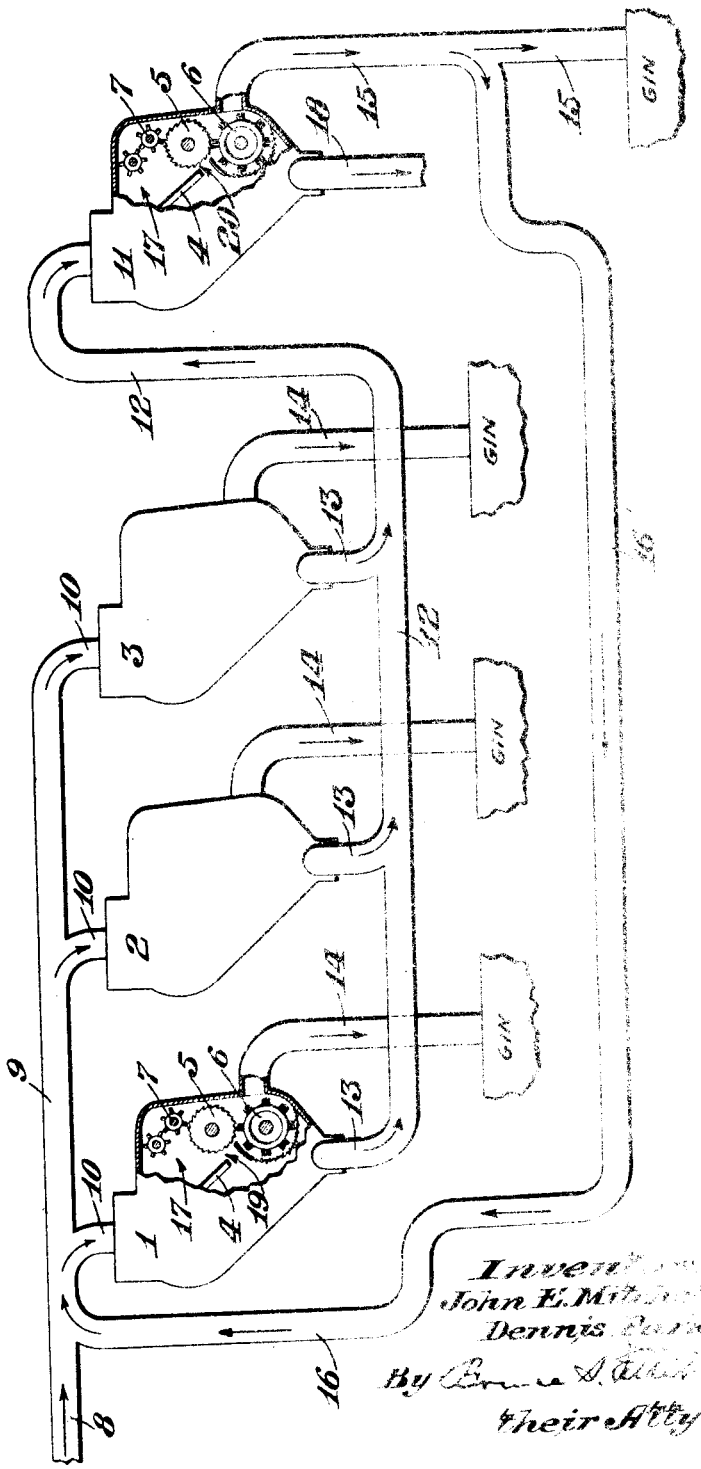

JOHN E. MITCHELL AND DENNIS PARKS, OF ST. LOUIS, MISSOURI.

ART OF CLEANING COTTON.

1,182,193.  Specification of Letters Patent.  Patented May 9, 1916.

Application filed April 19, 1915. Serial No. 22,273.

*To all whom it may concern:*

Be it known that we, JOHN E. MITCHELL and DENNIS PARKS, citizens of the United States, residing in the city of St. Louis and State of Missouri, have invented new and useful Improvements in the Art of Cleaning Cotton, of which the following is a specification.

This invention relates to the art of cleaning cotton, in the practice of which is involved the employment of machines of the type heretofore invented by John E. Mitchell, and forming the subject-matter of Letters-Patent No. 1,129,220, dated February 23rd, 1915. Such machines have now been in commercial use for a number of years, and it was early recognized that even under the best conditions of operation a considerable amount of cotton would pass through the machine with the hulls and be wasted. This is due to the fact that if the hull-board, down which the mixed cotton and hulls slide to be projected against the saw cylinder, be adjusted to permit of the ready escape of the hulls past the saw cylinder, a greater or less amount of the cotton in the form of small wads or balls will pass through with them. If, on the other hand, the hull-board is adjusted sufficiently close to the saw cylinder to prevent such escape of cotton, the escape of the hulls from the cleaning chamber past the saw cylinder will not be so rapid, with the result that the cleaning chamber necessarily becomes congested. This is caused by the fact that such close adjustment of the hull-board does not permit the instant discharge of the hulls when they reach the discharge opening. The hulls being of irregular shape, many of them are carried back up into the cleaning chamber by the saws, and only pass out of the opening when they fall in a certain position. This results in causing an accumulation of hulls in the cleaning chamber, a large percentage of which becomes entangled or rolled up in the bulk cotton, and when so entangled it is difficult to separate the hulls from the cotton, thus greatly lowering the capacity of the machine. The mass of cotton therein, which, for the best results, should be loose and open, tends to catch up more and more of these hulls, and the latter, as stated, becoming entangled with the cotton, act, as it were, as a binder, and cause the body of cotton to assume somewhat the form of a compact mass, which gradually increases in bulk as it is spun around by the impact of the saw cylinder, and from which the cotton is not so readily removed by the saws as when the mass of cotton is maintained in the loose and open form. Such relatively compact condition of the cotton also results in the production of a greatly reduced or lower grade of cotton by reason of the hulls entangled with the cotton being broken or cut by repeated contact with the saws and small pieces of the same being carried through with the cotton. Such result does not occur, however, when the mass of cotton is in loose and open form, and this latter condition of the cotton can only be maintained by providing for the rapid and continuous discharge of the hulls as fast as they reach the opening between the hull-board and the saw-cylinder, and this latter result, in turn, cannot be accomplished unless the opening between the hull-board and the saw cylinder is as wide as the largest dimension of the hulls, so that none of the hulls, after reaching the discharge opening, can be carried or knocked back into the cleaning chamber by the saws. The close adjustment of the hull-board, therefore, while materially decreasing the waste of cotton, also materially decreases the efficiency of the machine, and is therefore impracticable.

It is the purpose of our present invention to provide a method whereby the above obstacles and objections are overcome, and insuring that the cotton shall be thoroughly and rapidly cleaned, while the waste thereof will be rendered negligible. To this end the invention resides, in its broad aspect, in effecting a preliminary separation, in a plurality of cotton cleaning machines, of the major portion of the free cotton from the refuse and hulls, while providing for the free escape of the refuse, hulls and small wads or balls of cotton from the cleaning chambers of the machines; and then continuously passing the mixed refuse, hulls and cotton from the first machines to a final machine of the same construction, but the hull-board of which is adjusted sufficiently close to the saw cylinder to prevent the passage of the balls and wads of cotton past the saw cylinder without being caught up by the saws, while permitting the free escape of the hulls and refuse.

The cotton passing from the final machine may be returned to the distributer supplying the preliminary cleaning machines, and thus be combined in the said machines with the other cotton, and ultimately passed to the gins; or, said cotton from the final machine, being of a slightly lower grade than the main body of cotton, may be passed to a separate gin and maintained separate from the main body of cotton. The important results accomplished by our invention, therefore, are, that the main body of cotton is thoroughly cleaned and yields a much higher grade of raw cotton, when ginned, that it has heretofore been found possible to produce, so far as we are aware; while the second body of cotton, a large portion of which has heretofore been wasted, is practically entirely saved.

In order that our invention may be clearly understood we have illustrated diagrammatically, in the accompanying drawing, the construction and arrangement of apparatus which we employ.

Referring to the drawing, the numerals 1, 2 and 3, indicate, respectively, cotton-cleaning machines of the type set forth in the Letters-Patent aforesaid, each of said machines having a hull-board 4, saw cylinder 5, doffer-roll 6, and kicker-roll 7.

A further description of the machines is considered unnecessary, as the only feature of the machines entering into the present case is the adjustment of the hull-board relative to the saw cylinder, and which will be presently referred to.

The numeral 8 indicates a suction-conduit for drawing the cotton to be cleaned from any source of supply, as a wagon, and the numeral 9 any preferred form of cotton distributer, having branches 10, communicating with the respective cotton-cleaning machines 1, 2 and 3.

The numeral 11 indicates a fourth cleaning machine, having the same construction as the other machines, but a different adjustment of hull-board.

The numeral 12 indicates a conduit having branches 13 communicating with the refuse discharge outlets of the respective machines 1, 2 and 3, and communicating with the top, or the cotton-feeding chamber, of the machine 11. Each of the machines 1, 2 and 3 in practice is placed directly over a gin so that the cotton passes from each machine directly into the gin. This is illustrated diagrammatically in the drawing, however, by conduits 14 leading from the cotton-discharge outlet of the respective cotton-cleaning machines 1, 2 and 3 to the gins. The machine 11 also has a conduit 15 leading to a gin, and said conduit has a branch 16 leading back to the distributer 9, so that the cleaned cotton from the machine 11 may either be sent directly to a gin, or be returned to the machines 1, 2 and 3 and commingled with the cotton therein.

It is considered unnecessary to illustrate or refer to such features as valves, fans, suction-chambers, and the like, employed in causing the feed and distribution of the cotton, as their construction and operation are well-known, and any preferred arrangement and construction of such devices may be employed. To simplify the illustration we have therefore indicated the passage of the products by arrows, and omitted all illustration of means for causing such passage. Each of the cotton-cleaning machines 1, 2, 3 and 11 provides a cotton-cleaning chamber 17, in which the mixed cotton and hulls may be freely agitated by contact with the saw cylinder 5, the cotton being caught up by the teeth of the saw cylinder and carried under the kicker-roll 7 and then brushed off of the saw cylinder by the doffer-roll 6 and discharged into the conduit leading to the gin. The hulls are knocked back by the kicker-roll 7 and sliding down the hull-board 4 pass through the opening between the lower end of the said hull-board and the saw cylinder and ultimately are discharged from the machine. In the case of the final machine 11 they pass through a conduit 18 to the refuse pile.

In proceeding according to the present invention the hull-board 4 in each of the machines 1, 2 and 3 is so adjusted as to leave a relatively wide opening 19 between the lower end of the hull-board and the saw cylinder 5 to permit of the free discharge of refuse, hulls and small balls or wads of cotton from the cleaning chamber 17. The mixed refuse, hulls and cotton discharged from the machines 1, 2 and 3 are conveyed by the conduit 12 to the machine 11 and pass into the cotton-cleaning chamber thereof. In this machine the hull-board 4 is adjusted very much closer to the saw cylinder 5 than in the previous machines, so as to leave a relatively narrow opening 20 between the lower end of the hull board and the saw cylinder. This opening is of such size as to permit the refuse and hulls sliding down the hull-board to rapidly pass by the saw cylinder 5, while insuring that all cotton particles will be brought in such close proximity to the saw cylinder as to be engaged by the teeth thereof and thus be prevented from passing through the opening 20 with the refuse and hulls. This relatively close adjustment of the hull-board with respect to the saw cylinder can be employed in the machine 11 without the disadvantageous results referred to above, owing to the greater proportion, in the product treated, of hulls to cotton, and of the absence of large bunches of cotton, with which the hulls tend to become entangled, so that the hulls pass rapidly out through the opening 20, and the cotton is readily caught up by the saws and separated from the hulls. This close adjustment of the hull-board cannot be employed, however, in the first cleaning operation in the machines 1, 2 and 3, for the reasons heretofore stated. By making the opening 18 sufficiently large, however, to permit small wads and balls of cotton, as well as the hulls, to pass through, we prevent all tendency of the hulls to congregate in the cleaning chambers 17 of these machines, and subsequently recover the cotton discharged with the hulls from these machines by treatment in the cleaning machine 11 in the manner above described.

We have shown three main or preliminary cleaning machines, as employed in the present arrangement, as we have found in practice that the discharge from these machines will maintain about the proper supply for the machine 11; but the number of machines employed can be varied without departing from the spirit of the invention. A highly important feature of our invention, however, is that we continuously convey the discharge from a plurality of machines to a single machine for treatment. This procedure not only provides an adequate supply of material for the final machine, thus giving it the requisite efficiency; but it is also in the interest of simplicity and economy, as obviating the employment of the alternative method of conducting two cleaning operations in each cleaning machine. Such an arrangement would involve the employment of so many large, complicated and expensive machines as to be wholly impracticable.

We claim:

1. In the art of cleaning cotton, the method which consists in subjecting bulk cotton to the action of a plurality of cleaning machines each of which is adapted to remove the main body of cotton while providing a free discharge for refuse, hulls and small wads or balls of cotton from the machine, and continuously passing the discharged product from all of said machines to a final cleaning machine adapted to remove the remaining cotton from the hulls and refuse while providing a ready discharge of the hulls and refuse only therefrom.

2. In the art of cleaning cotton, the method which consists in subjecting bulk cotton to the action of a plurality of cleaning machines each of which is adapted to remove the main body of cotton while providing a free discharge for refuse, hulls and small wads or balls of cotton from the machine, continuously passing the discharged product from all of said machines to a final cleaning machine adapted to remove the remaining cotton from the hulls and refuse while providing a ready discharge of the hulls and refuse only therefrom, and continuously returning the cotton recovered from the latter machine to the previous machines.

3. In the art of cleaning cotton, the method which consists in selectively separating a portion of cotton from the hulls in each of a plurality of machines, and discharging therefrom the remaining cotton with the hulls, continuously passing the discharged product from all of said machines into a final machine, and therein effecting a separation of the remaining cotton from the hulls, and continuously returning the cotton recovered from the final machine to the first-named machines.

4. In the art of cleaning cotton, the method which consists in separately treating fresh portions of bolly cotton in each of a plurality of boll breakers and cleaners, delivering the cleaned seed cotton to a separate gin from each boll cleaner, and combining the waste hulls from the boll cleaners together with the cotton remaining therewith for further cleaning and treatment, the resulting seed and lint cotton being adapted to be fed directly back to the original supply to the first-mentioned boll cleaner or to a gin.

In testimony whereof, we have hereunto set our hands.

JOHN E. MITCHELL.
DENNIS PARKS.